April 24, 1956 H. STAUFERT 2,742,754
SPINDLE
Filed April 27, 1951
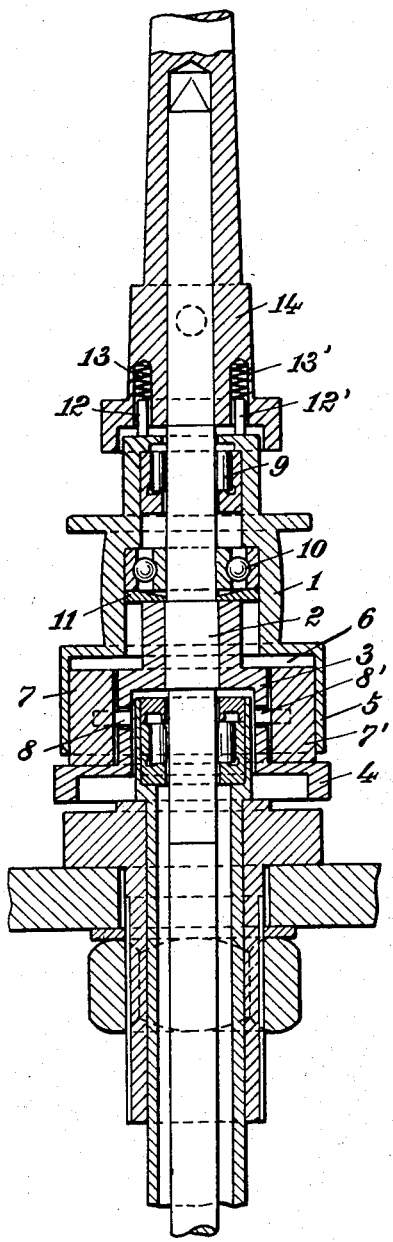
Inventor
Helmut Staufert
by
Toulmin & Toulmin
Attorneys

United States Patent Office 2,742,754
Patented Apr. 24, 1956

2,742,754

SPINDLE

Helmut Staufert, Stuttgart, Germany

Application April 27, 1951, Serial No. 223,393

Claims priority, application Germany May 3, 1950

3 Claims. (Cl. 57—88)

This invention relates to a spindle for spinning machines or twisting frames.

In case of belt- or band-driven spindles it is oftentimes necessary to stop the spindles without affecting the continuous rotation of the driving members. This is desirable, for instance, in case of spindles having a common driving belt, in order to avoid the stopping of all spindles when one spindle is stopped, or in case of twisting or doubling spindles, serving to wind up yarns twisted from several threads, in order to permit immediate stopping of the spindle in case of breakage of one thread.

It is known to provide spindles permitting continued rotation of the driving members in case of stoppage of the rotating bobbin, such spindles having a divided wharve, whose driving part is to be coupled, by frictional engagement, with a part secured on the spindle. The frictional engagement between the two parts of such spindles is effected by conical couplings, by means of which the driving part of the wharve which is loosely mounted on the spindle part of the wharve, can be non-positively connected to the spindle part of the wharve. Frictional couplings of this type are complicated, require large forces for their operation and, therefore, are subject to high wear and tear. Moreover, the manufacture of the spindles is rendered expensive by the special parts required for said frictional couplings.

It is an object of the present invention to provide a spindle which avoids these disadvantages and can be built up of simple standard parts, permitting quick disassembly of the components.

Another object of the invention is to provide a spindle of a construction which avoids sliding engagement of the parts and the inherent tendency of rucking or binding of the sliding surfaces.

With these and further objects in view, according to the present invention the driving part is supported directly on the spindle and the frictional engagement between the parts of the wharve is achieved by axially acting forces. The axial friction force in this case may be produced either by a load acting upon a surface of the driving part of the wharve or by a load acting upon the surface of the spindle part of the wharve. Moreover, said force may be reinforced by a radially acting frictional force, preferably produced by centrifugal weights which are mounted on the spindle wharve and take the driving wharve along as they are spread outwardly by the centrifugal forces developed therein.

The invention will be better understood by reference to the following detailed description in connection with the accompanying drawing showing a longitudinal section through a spinning spindle having the invention applied thereto.

Referring to the drawing, it will be seen that the arrangement comprises a driving part or wharve 1 and a part 3 which may be considered to be a part of the wharve or a part of the spindle fixedly seated on the spindle 2 and being adapted to be braked by engagement of suitable conventional means (knee brake, automatic stop brake or the like) with plate 4, in such a way that the whole driven unit, comprising the spindle 2 and the part 3 can be stopped. The driving part 1 is supported directly on the spindle 2, as by a roller bearing 9 and a ball bearing 10, the latter having an inner race surrounding the shaft and an outer race supporting the driving part 1. Bearing 10 is supported, through a disc 11, on the top side of the spindle part 3 and merely by its weight exerts a frictional force on the part 3 in an axial direction. A similar frictional action can be exerted also by the spindle 2 upon the driving wharve 1, for instance, by the provision of pins 12, 12' engaging in recesses of the top part 14 of the spindle and pressing on the top side of the driving wharve 1 under action of springs 13, 13'. By the axial frictional forces acting upon the wharve part 1 and part 3, a non-positive engagement is obtained which especially in case of smaller spindles is sufficient to ensure the driving of the spindle. A slight braking force exerted upon the braking disc of the spindle part 3 is sufficient to overcome the non-positive engagement and to allow the driving part 1 to run idle.

In case of larger types of spindles it is advantageous to reinforce the axial non-positive engagement by a radial one. This may be achieved with the aid of centrifugal weights whose frictional effect, due to centrifugal forces acting thereon, increases with increasing speed. In this case the driving part has at its lower end a cap 5 surrounding part 3 and leaving a free space 6 between its inner wall and part 3 for accommodation of a centrifugal coupling consisting, in the modification illustrated of two half-rings 7, 7' guided in corresponding holes of part 3 by means of pins 8, 8' so as to turn with the said part while being radially movable thereon.

The initial torque for the starting of the spindle on discontinuation of the braking action upon the braking disc 4 is produced by the friction in the bearings 9 and 10 and is then reinforced by the axial frictional forces transmitted through the spring-pressed pins 12, 13, and 12', 13' from the driving part 1. In case of large spindles the axial frictional engagement is sufficient to cause spreading of the centrifugal jaws 7, 7' when the speed reaches about 1000 R. P. M., and thus to cause a firm driving engagement of the driven unit with the spindle.

As the top part 14, is fixedly connected to the spindle 2, not only frictional engagement with the driving part 1 is established by the resiliently mounted pins 12, 12', but, simultaneously, rising of the wharve is also safely prevented.

While the invention has been described in detail with respect to a now preferred example and embodiment of the invention it will be understood by those skilled in the art after understanding the invention that various changes and modifications may be made without departing from the spirit and scope of the invention and it is intended, therefore, to cover all such changes and modifications in the appended claims.

What is claimed is:

1. A spindle arrangement for spinning and twisting frames comprising; a shaft, a wharve surrounding said shaft, means operable at a predetermined rotational speed of said shaft for effecting frictional driving engagement between said shaft and wharve, other means frictionally connecting said shaft and wharve for urging said shaft to rotate with said wharve, said other means including an anti-friction bearing having its outer race supporting the wharve by engagement therewith and having its inner race surrounding the shaft, and a friction disc frictionally supported on the shaft and supportingly engaging said outer race adjacent its outer periphery of said disc.

2. A spindle arrangement for spinning and twisting frames comprising; a shaft, an anti-friction bearing on the shaft, a wharve supported by the anti-friction bearing so as to be rotatable about the shaft, said wharve having a skirt thereon, a plurality of centrifugal weights mounted for rotation with the shaft within said skirt so as to be movable outwardly into frictional engagement with the skirt at a predetermined rotational speed of said shaft, and means establishing frictional engagement between the wharve and shaft for bringing the said shaft up to the said predetermined rotational speed.

3. In combination, in a driving arrangement of the nature described; a driving wharve having a recessed interior, a driven part mounted within said interior, friction means connecting the wharve and part for transmitting rotative effort from the wharve to the part, and centrifugal clutch means between the wharve and part responsive to a predetermined rotational speed of the part for drivingly connecting the said wharve and part.

References Cited in the file of this patent

UNITED STATES PATENTS

| | | |
|---|---|---|
| 1,523,724 | Schweiter | Jan. 20, 1925 |
| 2,168,248 | Staufert | Aug. 1, 1939 |
| 2,479,168 | Keene | Aug. 16, 1949 |
| 2,575,776 | White | Nov. 20, 1951 |

FOREIGN PATENTS

| | | |
|---|---|---|
| 34,848 | Germany | Mar. 15, 1886 |
| 371,856 | Germany | Mar. 22, 1923 |
| 527,071 | Germany | June 13, 1931 |
| 831,468 | France | June 7, 1938 |